W. T. BOND.
FEEDER FOR STRAW CUTTING MACHINES.
APPLICATION FILED APR. 21, 1909.
944,172.
Patented Dec. 21, 1909.
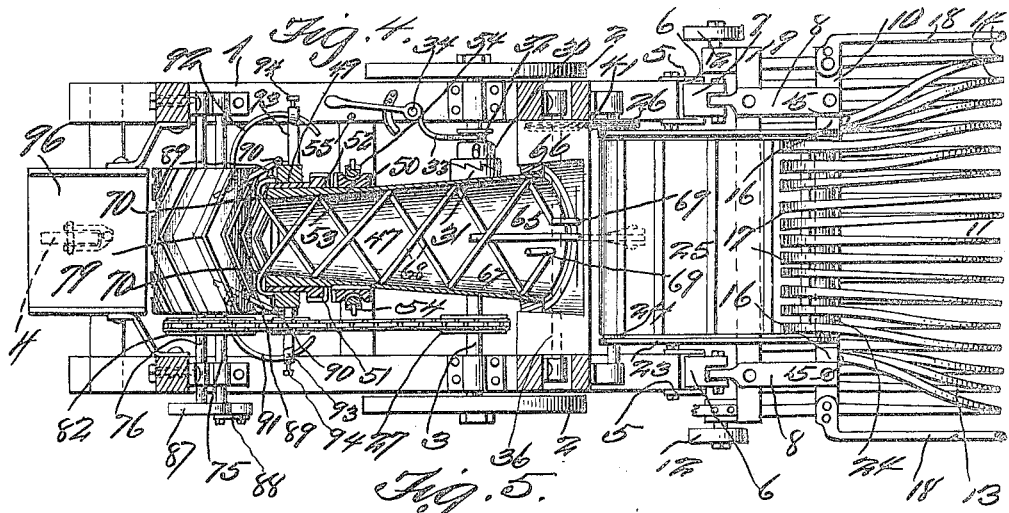
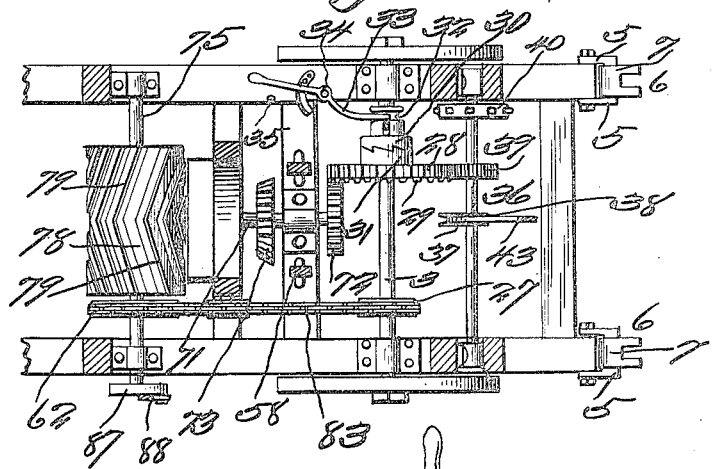
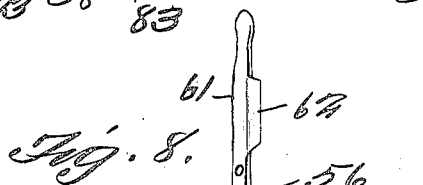
Witnesses
Inventor
William T. Bond.
By D. Swift & Co.
Attorneys

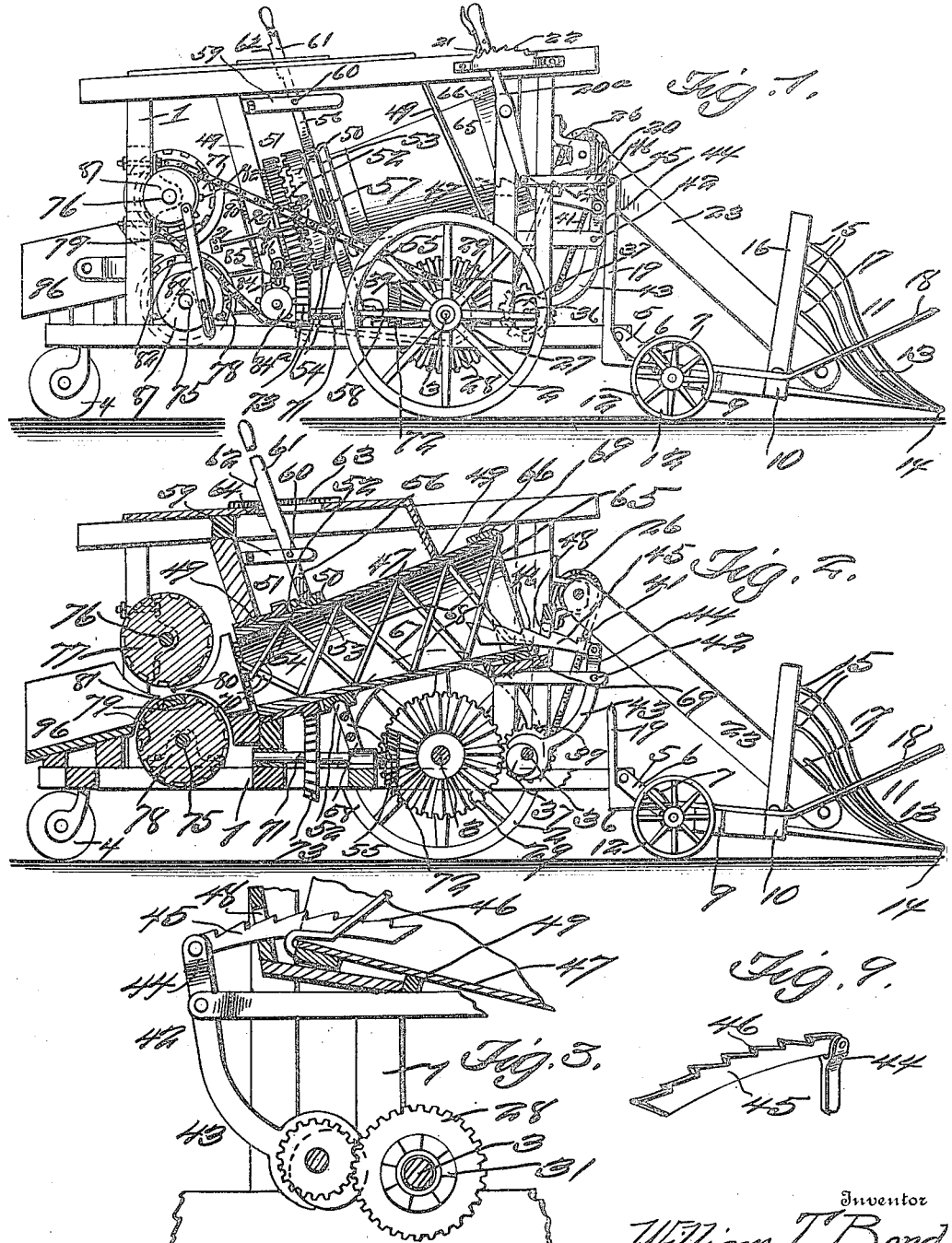

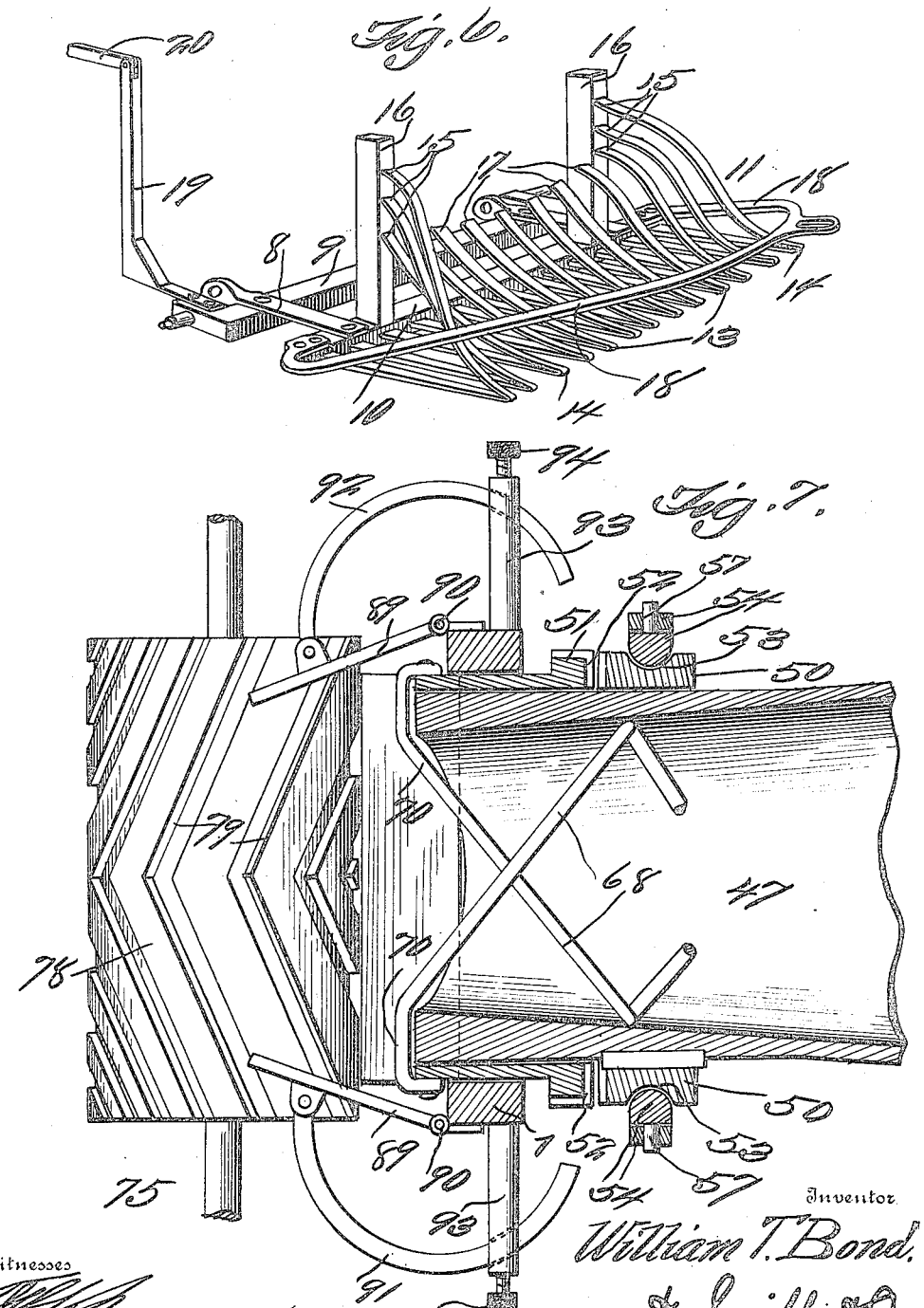

UNITED STATES PATENT OFFICE.

WILLIAM T. BOND, OF BELLEVILLE, KANSAS.

FEEDER FOR STRAW-CUTTING MACHINES.

944,172.

Specification of Letters Patent. Patented Dec. 21, 1909.

Application filed April 21, 1909. Serial No. 491,267.

*To all whom it may concern:*

Be it known that I, WILLIAM T. BOND, a citizen of the United States, residing at Belleville, in the county of Republic and State of Kansas, have invented a new and useful Feeder for Straw-Cutting Machines; and I do hereby declare the following to be a full, clear, and exact description of the invention, such as will enable others skilled in the art to which it appertains to make and use the same.

The invention, about to be set forth and claimed, belongs to the art of machines for treating alfalfa, hay or other similar products, and it particularly pertains to a machine, for this purpose, comprising new and novel structural details.

The invention, in its broadest latitude, has for its main object to provide a machine for cutting alfalfa or hay, as soon as it is mown.

A further object of the invention is the provision of a pair of crushing rollers, a tapering cylinder or drum having a spiral feed mechanism therein, designed to rotate independently of the cylinder.

This invention comprises further objects and combinations of elements which will be hereinafter more fully described, shown in the accompanying drawings, and the novel features thereof will be pointed out by the appended claims.

The features and elements and the arrangement thereof, for accomplishing the objects of this device or apparatus, may be changed and varied, that is to say, in an actual reduction to practice, the understanding, however, that the changes and variations accruing from said reduction to practice, are comprehended by the appended claims.

To obtain a full and correct understanding of the details of construction, combinations of features, elements and advantages, reference is to be had to the hereinafter set forth description and the accompanying drawings in connection therewith, wherein—

Figure 1 is a side elevation of the apparatus embodying the essential features of the invention. Fig. 2 is a central longitudinal sectional view through the apparatus. Fig. 3 is an enlarged detail view partly in side elevation and section showing the ratchet bar 45 and the means for operating the same. Fig. 4 is a top plan view of the apparatus, parts thereof being shown in section in order to further illustrate in elevation the features of the invention. Fig. 5 is a detail horizontal sectional view through Fig. 1, showing the construction of the device below the cylinder. Fig. 6 is an enlarged perspective view of the rake of the apparatus, and a portion of the elevating or conveying means for the alfalfa or hay. Fig. 7 is an enlarged sectional view of the rear portion of the cylinder 47 and its bearings, showing one of the crushing rolls, the members 89, and the means for adjusting the members. Fig. 8 is an enlarged detail perspective view of the means for centering the alfalfa between the two rollers. Fig. 9 is a perspective view of the ratchet bar.

In regard to the annexed drawings, 1 designates a rectangular framework, and 2 indicates the traction wheels, which are mounted upon the transversely disposed driving shaft 3.

4 designates a caster wheel, which is carried by the rear portion of the framework.

Pivoted to the forward lower portions of the framework are members 5, of the couplings 6, and pivoted to the members 7 of the said couplings are the straps 8, which are carried by the transverse beams 9 and 10 of the rake or gathering means 11. Journaled upon bearings of the beams 9 and 10 are wheels 12, designed for the purpose of supporting the rake or gathering means. The pivots between the members 7 and the straps 8 are disposed in direct alinement with the journals of the wheels 12, the purpose of which is to allow the gathering means to be raised or lowered. This gathering means or rake comprises a plurality of teeth 13. Each tooth of the rake or gathering means, consists of a single length of wire of sufficient rigidity, bent upon itself at 14, and having one end secured to the beams 9 and 10. Three of the ends 15 of the said teeth, upon either side of the gathering means, (which are not fastened to the said beams) are fastened to the upright members or beams 16. The ends 17 (which are six in number), are disposed free of any support, as will be evident. These ends 17 have flexible properties, in order to give as the alfalfa or hay passes thereover. Projecting from the beam 10 are forward extensions 18, to which a suitable evener (not shown) may be attached.

To tilt the forward portion of the gathering means, an angular lever 19 is provided (which projects from the beam 9) which is pivoted to a link 20, carried by the framework of the apparatus. This link 20 is provided with a suitable pawl 21, to engage the teeth of the segment rack 22, in order to hold the gathering means in a tilted position.

23 designates a conveyer frame, having rollers 24 at either end thereof, over which the conveyer belt 25 travels. One of the rollers 24 is extended beyond the conveyer frame, and is provided with a sprocket wheel 26, the purpose of which will be hereinafter set forth. Journaled upon and rotatable with the driving shaft 3 are a sprocket wheel 27 and a gear wheel 28. The gear wheel 28, upon one face thereof, is provided with radiating teeth 29.

Slidable upon but rotatable with the driving shaft is the clutch member 30, adapted to coöperate with the clutch member 31 of the gear wheel 28. This gear wheel 28 is only rotatable with the driving shaft when the clutch members are in engagement. The clutch member 30 is provided with an annular groove 32, and is moved upon the driving shaft by the forked lever 33, the forks of which engage said groove. This forked lever is pivoted to the frame by means of the pin or bolt 34, and is limited in movement (in one direction only) by means of the lug 35.

Journaled in suitable bearings and parallel with the driving shaft is a counter shaft 36, upon which are journaled an eccentric 37 (having an annular groove 38), a gear wheel 39, and a sprocket 40. Traveling about the sprocket 40 and the sprocket wheel 26, is a sprocket chain 41, in order that motion may be transmitted to the conveyer. The gear wheel 39 meshes with the gear wheel 28, in order that power may be transmitted to the counter shaft.

Pivoted in a bifurcated extension by means of the pin or bolt 42 is the forked lever 43, the forks of which partially encircle the annular groove 38 of the said eccentric. The end 44 of the forked lever 43 is pivoted to the end of a reciprocating ratchet bar 45, the teeth 46 of which are designed for the purpose of feeding the alfalfa or hay thoroughly into the cylinder 47. This ratchet bar 45 not only acts as a feeding device, but also performs the function of an agitator, in order to agitate and thoroughly loosen the alfalfa as it enters the cylinder. This ratchet bar 45 moves through an opening 48 of the frame of the apparatus.

The cylinder 47 is mounted in suitable bearings 49 of the framework, and is only rotatable when the clutch member 50 is thrown into engagement with the continuously rotating gear 51. This rotatable gear is in the form of an annular band or ring, and encircles the said cylinder. This rotatable gear is provided with clutch teeth 52, which are engaged by the teeth of the clutch member 50, that is to say when it is desired to revolve the said cylinder. The clutch member 50 is provided with an annular groove 53. Designed to engage this annular groove 53 are the forks 54 of the levers 55 and 56. The forks of these levers are connected together by means of a slot and pin connection 57. The lower lever 55 is pivoted (by means of its lower forked ends 58) to the lower portion of the said framework. While the upper lever 56 is pivoted to a projection 59 (of the framework), by means of the pin 60. The upper portion 61 of the lever 56 is provided with an outstanding longitudinal integral portion 62, designed for engaging the teeth 63. These teeth 63 are formed upon one side of the elongated opening or slot 64; and to cause the portion 62 to engage or disengage the said teeth, it is necessary to slightly spring the lever (and because of the flexible properties thereof it may be accomplished.)

The cylinder is slightly tapered as shown, and surrounding the end 65 thereof is a band or ring 66. Extending through the hollow portion 67 of the cylinder, and arranged spirally therein and with relation to one another are the members 68, (which forms a novel spiral feed mechanism) by which the alfalfa or hay is forced through the said cylinder. These members 68 are formed of any suitable metal, and are designed to have yielding properties, in order to give slightly as the hay or alfalfa is fed through the cylinder 47. These members are in the form of spiral coils, the coils of one are alternately arranged with relation to the coils of the other. In Fig. 2, the arrangement of the members 68 is clearly illustrated. The ends 69 of the members 68 are suitably and permanently attached to the band or ring 66. While the ends 70 of the said members 68 are secured to the rotating gear 51. Upon an examination of the drawings in connection with the description of the structural details of the invention (especially with regard to the cylinder and its coöperating parts) it will be understood that the spiral feed mechanism is rotating whenever the gear 51 is in motion, and it is not possible to rotate the cylinder until the clutch member 50 is operated to engage the clutch teeth of the gear 51. When the cylinder becomes choked, from the fast feeding of the alfalfa, it may be rotated, by the operation of the clutch member 50. When the members 68 of the spiral feed mechanism are rotated, they are held approximately equally spaced apart, by means of the band or ring 66, and the gear 51.

Mounted upon the lower portion of the framework, and in suitable bearings, is a secondary counter shaft 71, upon the ends of which gears 72 and 73 are mounted. The gear 72 is designed to mesh with the gear teeth 29 of the gear 28. While the gear 73 meshes with the gear 51 of the said cylinder. In this manner, motion is transmitted from the driving shaft to the spiral feed mechanism and the said cylinder.

Journaled in bearings 74 and upon the upper and lower portions of the framework are shafts 75 and 76. Carried by the shafts 75 and 76 are the crushing rollers 77 and 78. These rollers are provided with angularly arranged grooves 79, the purpose of which being to assist in crushing the alfalfa or hay, as it emerges from the said cylinder. The upper roller 77 is provided with a longitudinal cutting strip 80, which is designed for the purpose of cutting the alfalfa or hay as it is crushed. The lower roller 78 is provided with a strip of wood or other fiber 81, (which performs the function of a buffer) against which the cutting strip 80 abuts, as the rollers are revolved toward one another. The cutting strip 80 and the buffer are designed to register, at each revolution of said rollers. Upon the ends of the shafts 75 and 76 are sprockets 82, and traveling about these sprockets and the sprocket wheel 27, is a sprocket chain 83. To cause the lower sprocket wheel of the shaft 75 to rotate, by means of the said sprocket chain 83, a member 84 (which is adjustable by means of a screw and thumb nut 85 and 86) is provided to engage the said sprocket chain.

To direct the alfalfa or hay as it leaves the cylinder, the members 89 are provided, which are hinged or pivoted as shown at 90 to the framework of the apparatus. These members are adjustable toward one another by means of the segment levers 91 and 92, which penetrate the projections 92 (shown more distinctly in Fig. 7), and are held in their adjusted positions by the thumb screws 94, as will be evident.

As the machine is drawn through a field, after the hay is mowed, the hay or alfalfa is gathered by the gathering means, and then elevated by the conveyer belt 25 to the mouth of the cylinder 47. After the hay or alfalfa reaches the mouth of the cylinder, it is fed therein by means of the reciprocating rack bar 45, after which it is fed through the cylinder by means of the spiral feed mechanism (which consists mainly of the members 68) which mechanism may be thrown into and out of gear with the cylinder 47, by the lever 56, as will be clearly understood. As the hay or alfalfa emerges from the cylinder it is centered by the members 89 (which are adjustable), so as to be directed centrally between the crushing rolls 77 and 78. Each time the cutting strip or knife 80 and the fiber buffer are brought in registration, the hay or alfalfa is cut, into the lengths (equal to the circumference of the rolls), after which the hay or alfalfa is carried off by the chute 96, in order to be emptied into any suitable receptacle (not shown) which may be drawn in the rear of the machine.

The crushing rolls, the cylinder, the spiral feed mechanism, and the reciprocating rack bar 45 are all operated by the gear and sprocket chain mechanism of the apparatus, which mechanism receives power from the traction wheels 2. The elevating conveyer belt 25 is also driven by means of a sprocket chain connection, which coöperates with the gear mechanism.

From the foregoing, the essential features, elements and the operation of the device, together with the simplicity thereof, will be clearly apparent.

What is claimed, as new and useful is:—

1. In an apparatus for treating alfalfa or hay, a revoluble cylinder having a spiral feed mechanism therein, a combined auxiliary feed and agitating means located at and partially extending into the mouth end of said cylinder, and means for simultaneously operating the first named mechanism, and the auxiliary feed and agitating means.

2. In an apparatus for treating alfalfa or hay, a revoluble cylinder, a pair of pivoted members one disposed on either side of the cylinder and at the discharge end of the cylinder so as to direct the hay to cutting and crushing rolls, and means for holding the members in their adjusted positions.

3. In an apparatus for treating hay, a revoluble cylinder, pivoted members upon either side of the cylinder and at the discharge end of the cylinder so as to direct the hay between cutting and crushing rolls, means for holding the members in their adjusted positions, said cylinder having a feed mechanism therein, a combined auxiliary feed and agitating means positioned at and partially extending into the mouth end of the cylinder, and means for simultaneously operating the first named feed mechanism, the auxiliary feed and the agitating means.

4. In an apparatus for treating hay, a revolving tapering cylinder, a spiral feed mechanism within the cylinder and rotatable independently thereof, and a combined auxiliary feed and agitating ratchet bar positioned at and partially extending into the mouth end of the cylinder.

5. In an apparatus for treating hay, a revolving tapering cylinder, a spiral feed mechanism within the cylinder and rotatable independently thereof, a combined auxiliary feed and agitating ratchet bar positioned at and partially extending into the mouth end of the cylinder, pivoted members upon either side of the cylinder at the discharge end thereof for directing the hay to cutting and crushing rolls, and means for holding the members in their adjusted positions.

6. In an apparatus for treating hay, a revolving tapering cylinder, a spiral feed mechanism within the cylinder and rotatable independently thereof, a combined auxiliary feed and agitating ratchet bar positioned at and partially extending into the mouth end of the cylinder, pivoted members upon either side of the cylinder at the discharge end thereof for directing the hay to cutting and crushing rolls, means for holding the members in their adjusted positions, and means for simultaneously operating the first-named feed mechanism, the auxiliary feed and agitating ratchet bar.

7. In an apparatus for treating hay, a revoluble cylinder having spiral coil feed members therein, a combined auxiliary feed and agitating means, means for simultaneously operating the spiral feed members, the auxiliary feed and the agitating means, pivoted members upon either side of the cylinder adjacent to the discharge end thereof so as to direct the hay to and between cutting and crushing rolls, and means for adjusting the pivoted members and holding them when adjusted.

8. In an apparatus for treating hay, a revoluble cylinder having an interior spiral feed mechanism, a combined feed and agitating means at the mouth of the cylinder, pivoted members operable at the said discharge end of the cylinder, and means for adjusting the pivoted members.

9. In an apparatus for treating hay, a combined compacting and agitating mechanism, pivoted members for directing the hay from said compacting and feeding mechanism, and means for adjusting the pivoted members and holding them in position when adjusted.

10. In an apparatus for treating hay, a revoluble cylinder having an interior spiral feed mechanism, a combined feed and agitating means at the mouth end of the cylinder, pivoted members upon either side and at the discharge end of the cylinder so as to direct the hay between cutting and crushing rolls, said pivoted members having curved members for adjusting the pivoted members, and means engageable with said curved members, whereby the pivoted members may be held in adjusted positions.

11. In an apparatus for treating hay, a revoluble cylinder having an interior spiral feed mechanism, a combined feed and agitating means at the mouth end of the cylinder, said cylinder having at its discharge end, a pair of pivoted members so as to direct hay to and between cutting and crushing rolls, semiannular rings pivotally connected to the pivoted members, said apparatus having lateral projections through which the semiannular rings penetrate, and means to engage the semiannular rings whereby the pivoted members may be held in adjusted positions.

12. In an apparatus for treating hay, a revoluble cylinder having an interior spiral feed mechanism, a combined feed and agitating ratchet bar located at and partially extending into the mouth end of the cylinder, said cylinder having at its discharge end and upon either side thereof a pair of pivoted members, semiannular rings pivotally connected to the pivoted members, said apparatus having lateral projections through which the semiannular rings penetrate, means carried by said projections to engage said semi-annular rings, whereby the pivoted members may be held in adjusted positions, and means for operating the first-named feed mechanism and the combined auxiliary feed and agitating ratchet bar.

In testimony whereof I have signed my name to this specification in the presence of two subscribing witnesses.

WILLIAM T. BOND.

Witnesses:
W. M. HOFFMAN,
DEAN SWIFT.